Feb. 9, 1954 K. L. SEELEY 2,668,427
COFFEE MEASURE AND DISPENSER HAVING AN INTEGRAL
HANDLE AND CLOSURE OPERATING MEMBER
Filed Feb. 9, 1950

INVENTOR
KERMIT L. SEELEY
BY
*Mason & Graham*
ATTORNEYS

Patented Feb. 9, 1954

2,668,427

UNITED STATES PATENT OFFICE 2,668,427

COFFEE MEASURE AND DISPENSER HAVING AN INTEGRAL HANDLE AND CLOSURE OPERATING MEMBER

Kermit L. Seeley, Los Angeles, Calif.

Application February 9, 1950, Serial No. 143,801

1 Claim. (Cl. 65—28)

This invention has to do with measuring cups and dispensers being in the nature of a manually held combined measuring cup and dispenser.

An object of the invention is to provide a novel measuring cup dispenser of simple form and construction which can be easily manipulated with one hand.

Another object is to provide such a device particularly suited for measuring coffee or the like which can be readily dipped into the coffee to fill it and which can be operated to dispense the coffee through a limited aperture in the bottom of the device.

A further object is to provide a measuring cup device having an opening at the bottom which is normally closed by a movable closure. In this connection it is an object to provide such a device having a handle which serves both as a handle and as an operating member for opening the closure.

These and other objects will be apparent from the drawing and the following description thereof.

Referring to the drawing, which is for illustrative purposes only:

Figure 4:
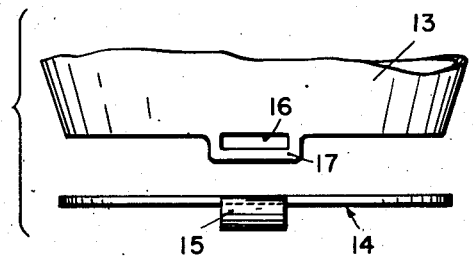
Fig. 4 is an exploded view of the lower end of the device as viewed on the line 4—4 of Fig. 3 with the closure element removed.
Figure 3:
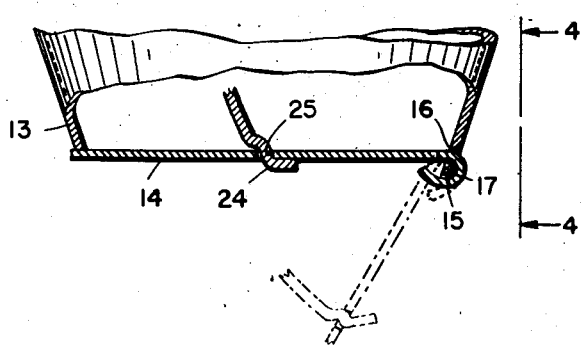
Fig. 3 is an enlarged fragmentary sectional elevational view of the lower end of the device.

More particularly describing the invention, reference numeral 11 generally indicates a receptacle or cup, and this is provided with a handle, generally indicated by 12. The receptacle may be of metal, of a so-called plastic or of any desired material. Preferably the receptacle is larger at the top than at the bottom and is shown as being formed by a conoidal wall 13. The receptacle is open at the top or large end. The other end is normally closed by a hinged closure element or plate 14 which, in the form of the invention shown, is provided with an extension 15 consisting of a strip of the material of the closure bent back upon itself as best shown in Figs. 3 and 4. This extension 15 is received in an elongated eye 16 defined by a section 17 at the lower edge of the cup 13 thereby providing a hinge connection between the closure and the cup.

Figure 1:
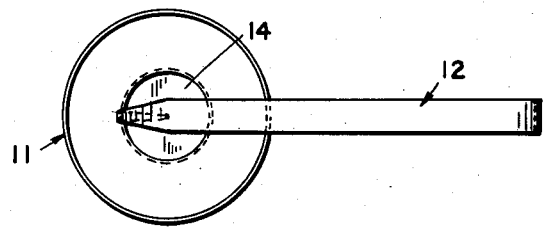
Fig. 1 is a plan view of the device embodying the invention.
Figure 2:
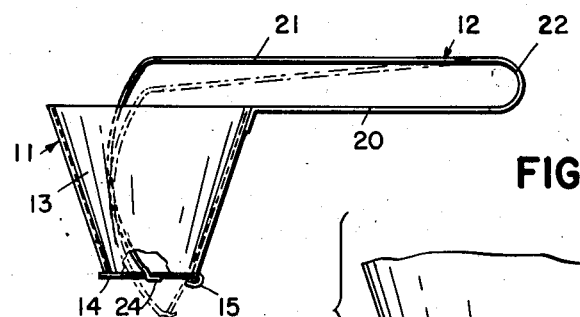
Fig. 2 is a side elevational view of the device of Fig. 1 partially broken away.

In order to maintain the closure 14 closed in the position in which it is shown in the drawing, the handle is formed to provide a base section 20 and an operating lever portion 21, the sections being connected by a curved section 22. At its forward end the section 21 extends into the cup 13 and terminates in a foot 24 which is received in a slot 25 in the closure plate 14. It will be seen by reference to Figs. 2 and 3 that the handle may be manipulated to depress the section 21 thereof for the purpose of opening the closure 14. For this purpose the handle is preferably made of spring material.

In the operation of the device it will be apparent that coffee or other finely divided substances to be measured may be easily scooped up into the top or open end of the cup. In order to deliver the contents of the cup it is only necessary to depress the upper or operating lever section 21 of the handle to the broken-line position of Fig. 2 thereby opening the closure 14. It will be apparent that the contents may be accurately delivered into a small opening or the like by reason of the relatively small outlet at the bottom of the cup through which the contents must pass.

While the invention has been particularly shown and described, it is contemplated that various changes and modifications may be made without departing from the scope of the invention as set forth in the claim.

I claim:

A dispensing measuring cup, comprising a receptacle having an open top and an opening at the bottom, a closure member hingedly mounted at the lower end of the receptacle and normally closing said opening, a handle on said receptacle, said handle comprising a base section secured to said receptacle and extending laterally therefrom, and a springy operating lever section bent back upon the base section and extending generally axially through said receptacle to said closure member, said operating section being pivotally connected to said closure plate, said operating section being movable against the springiness thereof to move said plate to open position, said handle normally acting to yieldably hold the plate closed.

KERMIT L. SEELEY.

References Cited in the file of this patent

UNITED STATES PATENTS

| Number | Name | Date |
|---|---|---|
| Re. 18,891 | Fulton | July 11, 1933 |
| 883,796 | Flippen | Apr. 7, 1908 |
| 1,277,999 | Nordin | Sept. 3, 1918 |
| 1,290,814 | Weaver | Jan. 7, 1919 |
| 1,880,625 | Wilmeth | Oct. 4, 1932 |
| 2,281,380 | Peterson | Apr. 28, 1942 |